May 10, 1938.   G. C. PEARCE   2,116,909
REFRIGERATING APPARATUS
Filed Jan. 30, 1934   8 Sheets-Sheet 4

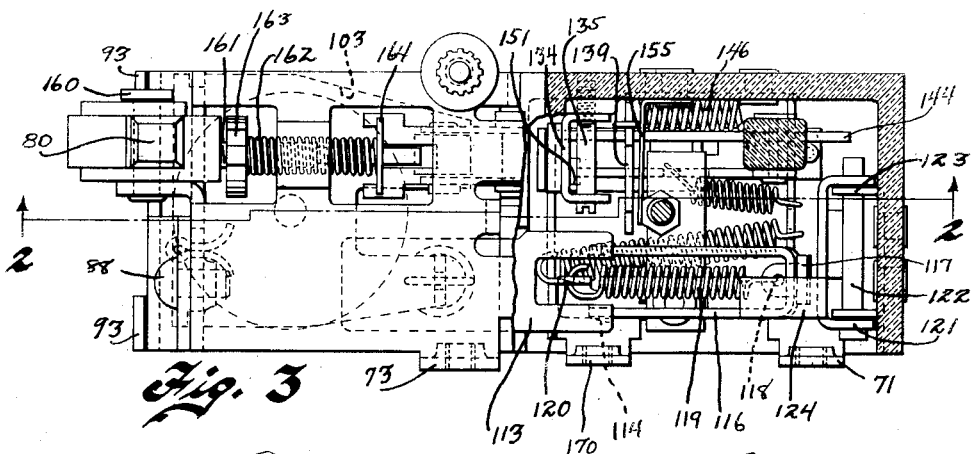
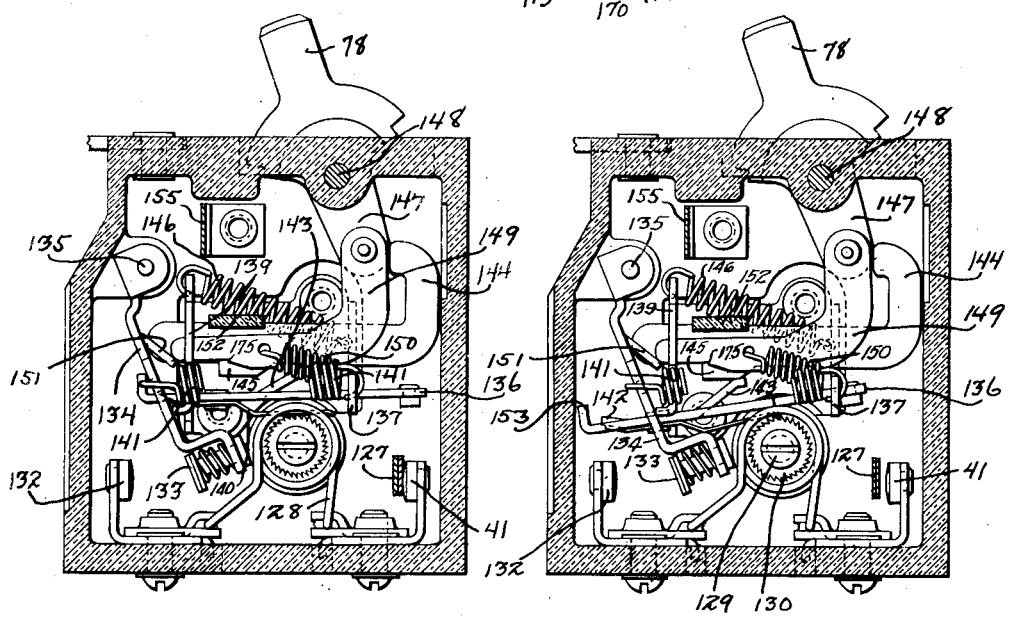

Inventor
George C Pearce
By Spencer Hardman and Zehr
Attorneys

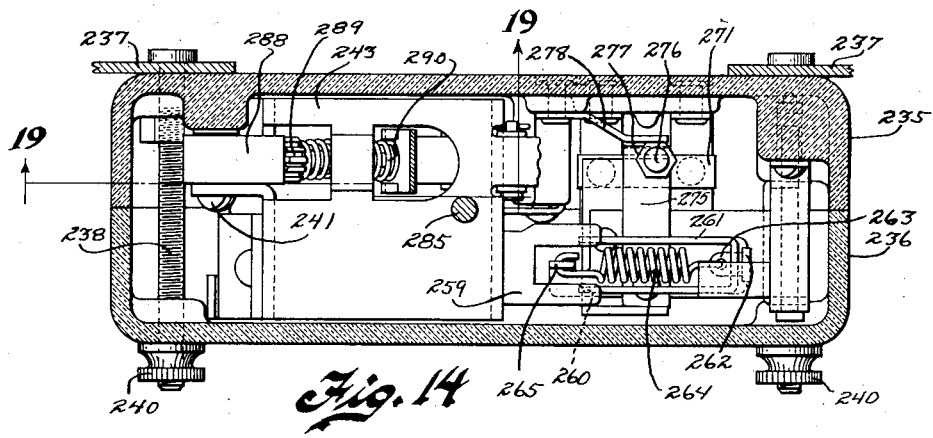
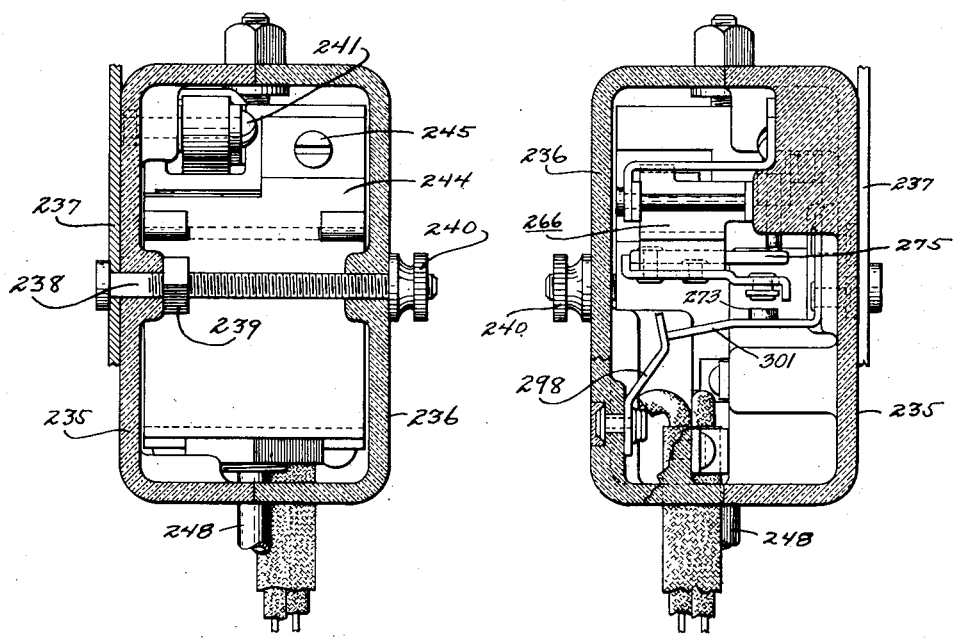

May 10, 1938.  G. C. PEARCE  2,116,909
REFRIGERATING APPARATUS
Filed Jan. 30, 1934  8 Sheets-Sheet 8

Inventor
George C Pearce
By Spencer Hardman and Fehr
Attorneys

Patented May 10, 1938

2,116,909

UNITED STATES PATENT OFFICE 2,116,909

REFRIGERATING APPARATUS

George C. Pearce, Dayton, Ohio, assignor to General Motors Corporation, Dayton, Ohio, a corporation of Delaware Application January 30, 1934, Serial No. 708,994

4 Claims. (Cl. 200—81)

This invention relates to refrigerating apparatus and more particularly to pressure operated refrigerator control switches.

It is an object of my invention to provide an improved switch mechanism for refrigerating apparatus, said switch mechanism being provided with a temperature adjusting means providing continuous cycling above and below freezing temperature, and with a defrosting mechanism which is automatically rendered ineffective when the proper temperature is reached, together with an improved overload means for the electric circuit in which a finger manipulating device serves both for shutting the refrigerator on and off as well as for resetting the overload device and serving as an indicating means for indicating the condition of the overload means.

It is another object of my invention to provide a switch for a refrigerating system provided with parts that may be easily manufactured, assembled, and repaired, and so arranged that the manually manipulatable control devices and the indices therefor may be symmetrically arranged.

It is another object of my invention to provide an improved switch wherein a terminal box is directly connected with the switch but which prevents ready access to the switch mechanism while at the same time it provides easy access to the terminal connection of the switch and provides a place for a direct current adapter as well as additional terminals for connection to the other accessories such as a door switch and light.

Further objects and advantages of the present invention will be apparent from the following description, reference being had to the accompanying drawings, wherein a preferred form of the present invention is clearly shown.

In the drawings:

Fig. 3 is a sectional view along the line 3—3 of Fig. 1;

Fig. 4 is a sectional view of the right hand portion of Fig. 3, taken upon a line corresponding to the portion of the section line 2—2 upon the right side of Fig. 3, and showing the thermal overload means and ratchet wheel in the position it assumes after being tripped by an overload in the electric circuit;

Fig. 5 is a sectional view similar to Fig. 4 but differing in that it shows the mechanism thermal overload mechanism after being manually tripped to open the electric circuit;

Fig. 14 is a sectional view along the line 14—14 of Fig. 13;

Fig. 15 is a sectional view along the line 15—15 of Fig. 13;

Fig. 16 is a sectional view along the line 16—16 of Fig. 13;

Figure 10:
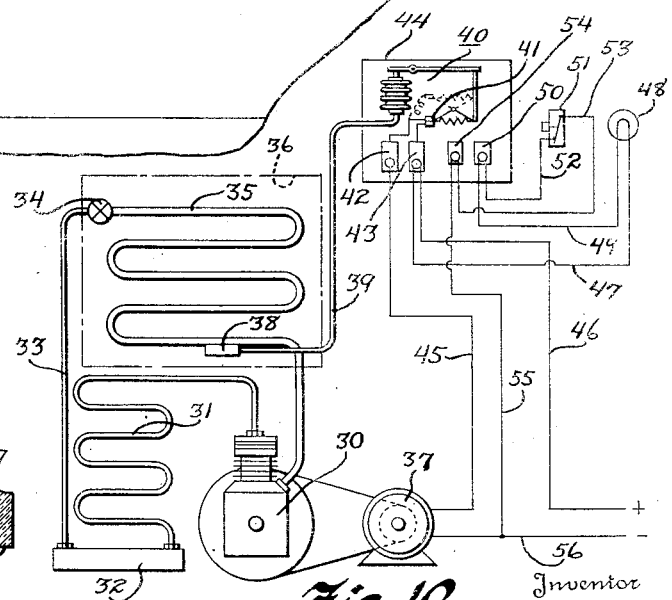
Fig. 10 is a diagrammatic view of a refrigerating system showing diagrammatically the switch, the terminal box, the door switch, the door light, and the electrical circuits.
Figure 11:
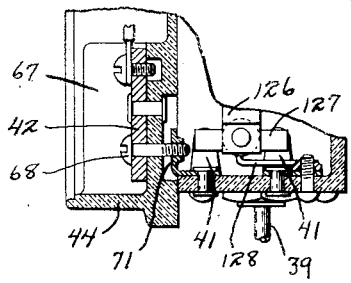
Fig. 11 is a sectional view showing the connection between a terminal in the terminal box and a set of contacts in the switch.

Referring to the drawings and more particularly to Fig. 10, there is shown a refrigerating system comprising a compressor 30 for compressing the refrigerant and for forwarding the compressed refrigerant to a condenser 31 where the compressed refrigerant is condensed and collected in a receiver 32. From the receiver 32 the liquid refrigerant is forwarded through a supply conduit 33 to an expansion valve or other suitable restricting means 34 which controls the supply of liquid refrigerant to an evaporator 35 located within the food compartment of the refrigerator 36 where the evaporator absorbs heat causing the liquid refrigerant to vaporize and be returned to the compressor 30. The compressor 30 is driven by an electric motor 37 under the control of a thermostat 38 in heat exchange relation with the evaporator 35.

Figure 9:
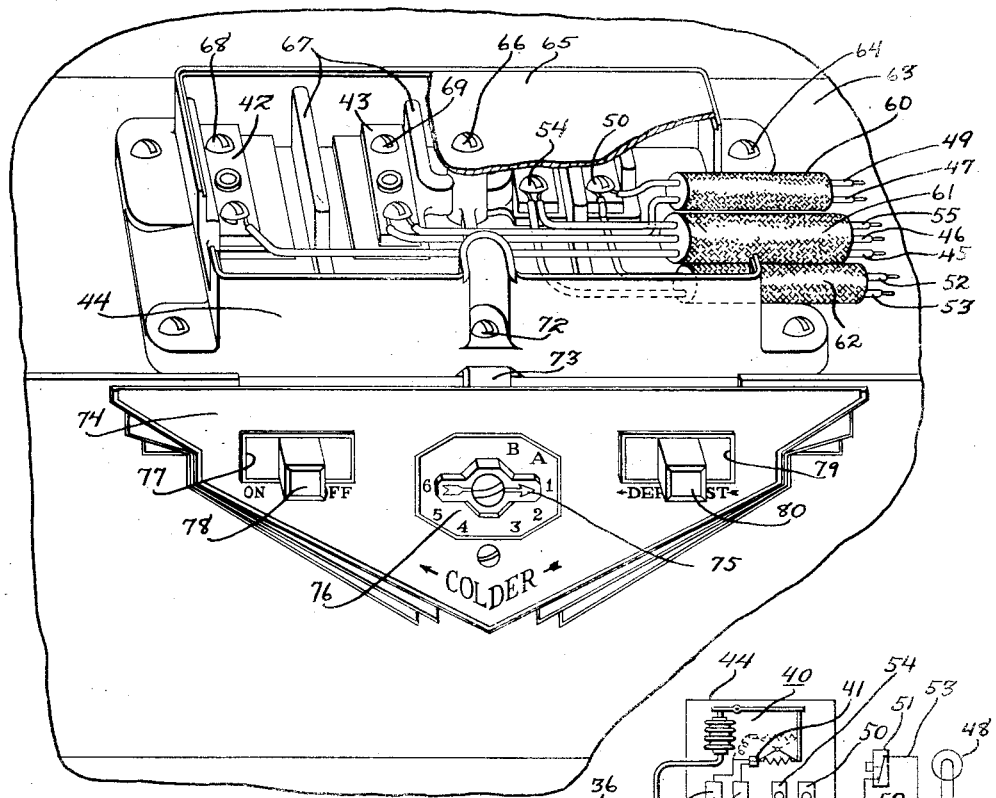
Fig. 9 is a perspective view showing the terminal box covering the switch together with the escutcheon plate, the temperature regulator, as well as the on and off, and resetting finger manipulating device and the finger manipulating defrosting device.

The thermostat 38 is connected by a tube 39 to the pressure responsive snap acting switch means 40 having a set of switch contacts 41 which are connected to the terminals 42 and 43 located in the terminal box 44 shown in Fig. 9. The terminal 42 is connected by an electrical conductor 45 to one of the lead-ins of the motor, while the terminal 43 has one electrical conductor 46 leading to a source of electric energy, while another electrical conductor 47 leads from the terminal 43 to a refrigerator light 48 located within the food compartment of the cabinet 36. The door light 48 is also connected by an electrical conductor 49 to a terminal 50 located in the terminal box 44. The terminal 50 is also connected by an electrical conductor 52 to a door switch 51 which is operated by the opening and closing of the refrigerator cabinet door so as to cause the light 48 to be lit when the door is open. The door switch 51 is also connected by an electrical conductor 53 to a terminal 54 located in the terminal box 44. This terminal 54 is also connected by an electrical conductor 55 to the electrical conductor 56 which connects the second lead-in of the electrical motor 37 to a side of the supply line. The conductors 47 and 49 are grouped together within an insulating covering 60 which leads from the terminal box 44 to the door light 48. The electrical conductors 45, 46, and 55 are grouped together within an insulating covering 61 which leads from the terminal box to the electric motor 37 and the supply circuit. The electrical conductors 52 and 53 are grouped together within an insulating covering 62 which leads from the terminal box to the door switch 51.

The terminal box 44 rests upon the frame member 63 extending across the top of the cabinet and is fastened thereto by suitable screws 64. The terminal box 44 is provided with a removable cover 65 which is fastened thereby by a screw 66. Within the terminal box there is provided partitions 67 which divide the various terminals from each other. Additional space is provided adjacent the terminals 42 and 43 to receive a direct current adapter if one is required. Resting within a notch in the frame member 63 immediately beneath the terminal box is the switch mechanism. This switch mechanism is connected to the terminal box 44 and to the terminals 42 and 43 by screws 68 and 69 which extend through the terminals 42 and 43 and are threaded into the brackets 70 and 71 of the switch mechanism. A third screw 72 extends from the terminal box and is threaded into an ear 73 formed on the framework of the switch mechanism.

Upon the front of the cabinet immediately in front of the switch mechanism there is provided an escutcheon plate 74 provided with an indicating knob 75 having an arrow cooperating with the dial 76 formed on the escutcheon plate in order to provide manipulating and indicating means for temperature regulation. At the left side of the escutcheon plate there is provided a rectangular aperture 77 having the finger manipulating device 78 projecting therefrom which cooperates with the indications "On" and "Off" on the escutcheon plate in order to indicate the condition of the overload means as to whether the overload means is in closed or open circuit position to turn the refrigerating system on or off.

At the right side of the escutcheon plate 74 in a symmetrical arrangement with the knob 75 and the manipulating device 78, there is provided a rectangular aperture 79 through which projects a finger manipulating and indicating device 80 which cooperates with the designation "Defrost" upon the escutcheon plate. This device 80 may be moved in the direction of the arrow in connection with the word "Defrost" in order to initiate a defrosting cycle which will permit the temperature of the evaporating means to rise above freezing in order to permit frost to melt therefrom and after a certain high temperature limit is reached sufficient to accomplish the defrosting, this device 80 will be returned to ineffective position, thus permitting the refrigerating system to resume normal operation.

Figure 1:
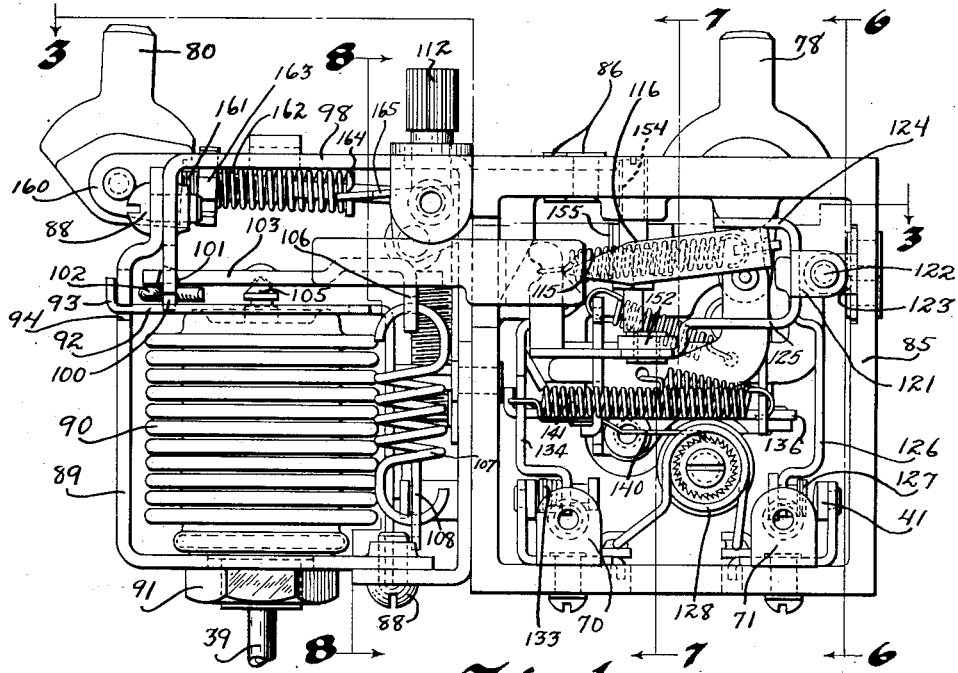
Fig. 1 is a top view of one form of my improved switch with the terminal box removed.
Figure 8:
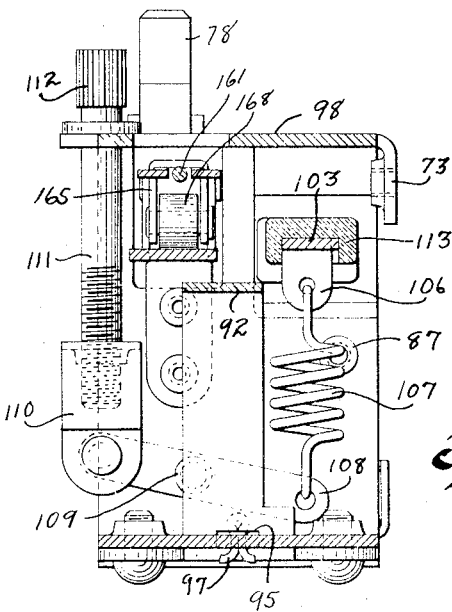
Fig. 8 is a sectional view along the line 8—8 of Fig. 1.

Referring now more particularly to Fig. 1, there is shown at the right side of Fig. 1 a box 85 open at the top (as viewed in Fig. 9) and formed of a suitable structural insulating material, such as hard rubber or a phenol condensation product, such as "Bakelite". Fastened to the box 85 by rivets 86 is a bracket 87 formed of a flat metal which supports the left side of the switch mechanism as viewed in Fig. 1. Connected to the extremities of this bracket by the screws 88 is an L-shaped bracket 89 which supports a bellows 90 connected at its lower end to the tube 39 which leads to the thermostat bulb 38 located in the food compartment. The lower end of the bellows is fastened to the L-shaped bellows supporting bracket 89 by a nut 91. In order to prevent excessive expansion of the bellows 90 there is provided an inverted L-shaped flat metal stop member 92 which is provided with projections 93 at one end which extend through slots 94 in the bellows supporting member 89 while the other end, as best shown in Fig. 8, is provided with an aperture or slot 95 which receives a tongue 96 through which extends a cotter pin 97 for holding the bellows stop in place.

A portion 99 of the bracket 98 extends downwardly and is provided with a tongue 100 which extends through an aperture 101 having beveled side walls which form knife edges at one of the surfaces of a bellows follower 103 formed of heavy sheet steel or brass. This bellows follower 103 is held in place by a cotter pin 102 which extends through the tongue 100. The bellows follower 103 is provided with a depression in one side which receives a conical pin 105 which extends from the movable end of the bellows 90.

At one side, the bellows follower 103 is provided with an ear 106 extending at right angles which is connected to a tension regulating spring 107. This tension regulating spring is connected at its lower end to a transverse lever 108, better shown in Fig. 8, which is pivoted upon a pin 109 at its intermediate point to the bracket 98. The other end of the lever 108 is pinned to the member 110 which is threaded upon an adjusting screw 111 provided with a splined head 112 upon which the temperature regulating knob 75 is mounted. By turning the temperature regulating knob, the tension of the spring 107 is varied in order to control and vary the expansion of the bellows 90. By this arrangement the size of the regulating screw and the spring may be made small since the use of the lever 108 permits of considerable variation in travel between the member 110 and the lower end of the spring 107. This arrangement also avoids the binding action found in most other arrangements for temperature adjustments.

The bellows follower 103 is also provided with a hard rubber or "Bakelite" insulating arm or extension 113 molded thereon which insulates the bellows and the bellows follower from the switch mechanism and which is provided at its extremity with a pair of V-shaped notches 114 which receive the knife edges 115 formed upon the legs of a U-shaped secondary lever 116 which forms a part of a double toggle snap acting mechanism. The U-shaped secondary lever is provided at the opposite or closed end with a T-shaped member 117 which extends through a slot in the end portion of the U-shaped member and is provided with an eyelet 118 to which is connected the tension coil spring 119. The other end of this tension coil spring is connected to an upstanding portion 120 of a contact member 121 of irregular shape which is pivoted upon the pin 122 to a bracket 123 riveted to the wall of the box 85. This contact lever is also provided with integral stop portions 124 and 125 which limit the movement of the closed end of the U-shaped secondary lever 116. The contact lever 121 also has another arm 126 which carries by a swivel pin arrangement a contact bar 127 which bridges the contacts 41 in order to complete the electric circuit.

As stated before, the contact 41 nearest the open side of the box 85 is provided with a threaded bracket 71 for connection with the screw 68 extending from the terminal 42 and the terminal box 44 and in this way electrical energy is supplied to these contacts. Extending from the opposite contact 41 is a heater coil 128 which extends around a pin 129 having a ratchet wheel 130 fastened thereto by a fusible material, such as solder. This pin 129 is provided with a threaded portion which passes through the wall of the box 85 and is threaded into the nut 131 seated in the recess in the opposite side of the bottom wall of the box 85. The other end of the heater coil 128 is connected to one of a set of overload contacts 132, while the other contact of this set is connected to the threaded bracket 70 which is connected by the screw 69 to the terminal 43 in the terminal box 44.

The contacts 132 are adapted to be bridged by the overload contact bar 133 which is connected by a pin and spring connection to the lower end of an overload lever 134 pivoted on a pin 135 fixed in the bottom wall of the box 85. This overload lever 134 is normally held in a vertical position such as that shown in Figs. 1 and 2 by a slide bar 136 which extends through a slot in the lower end of an arm 137 of a bracket 138 and which has its other end guided by the arm 139 at the opposite side of the bracket 138. This slide bar is provided on its bottom side with a light leaf spring member 140 which engages the ratchet wheel 130 in order to prevent the overload contact lever 134 from moving to open circuit position which is illustrated in Fig. 4. The overload contact lever 134 is yieldingly urged to open circuit position by the tension spring 141 which extends from the overload contact lever 134 to the arm 137. When an excessive electrical current passes through the heater coil 128 for a sufficient length of time the pin 129 is heated sufficiently to melt the fusible binder thereby permitting the ratchet wheel 130 to turn, thus releasing the leaf spring 140 and the slide bar 136 in order to permit the overload contact lever 132 to move to open circuit position under the tension of the overload spring 141. The slide bar 136 is provided with bent-up lip or tongue 142 which normally is adapted to engage a shoulder upon the overload contact lever 134. This slide bar 136 is also provided with a second bent-up lip or tongue 143 which extends in the opposite direction. When it is desired to shut off the refrigerator the overload finger manipulator 78 is moved to the left as viewed in Figs. 1 and 2, thus moving to the right a hook-shaped slide bar 144 as shown in Fig. 5 so that a cam 145 on its bottom edge engages the upper surface of the lip 143 so as to move the free end of the slide bar 136 downwardly to disengage the lip 142 from the overload contact lever 134. This hook-shaped slide bar 144 is yieldingly urged to the left by the tension coil spring 146 in order to hold it against the lower projecting portion 147 of the finger manipulator 78. The finger manipulator 78 is pivoted upon the pin 148 to a wall of the box 85.

Figure 2:
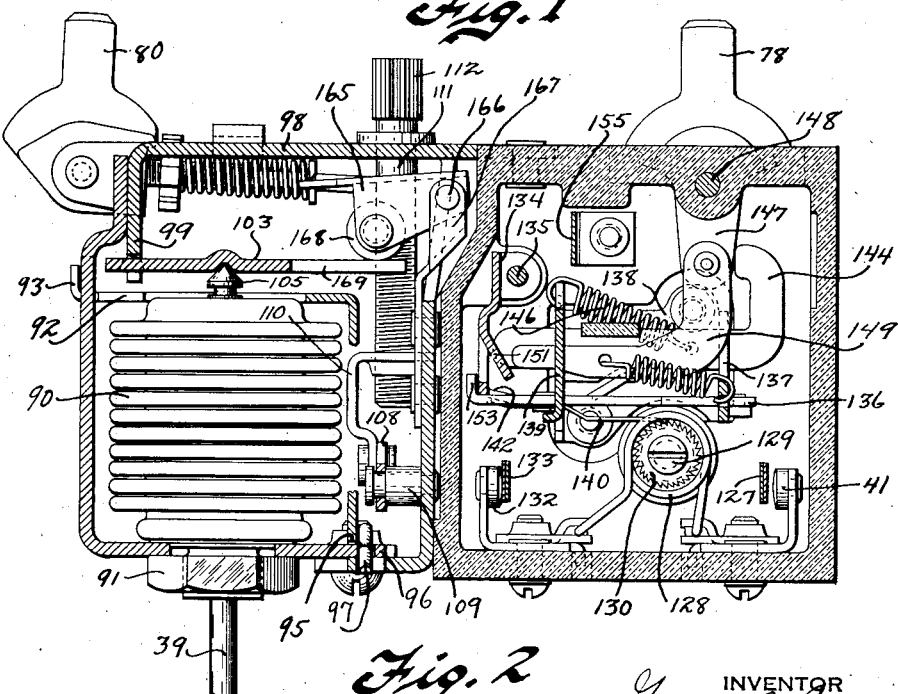
Fig. 2 is a sectional view along the line 2—2 of Fig. 3.
Figure 6:
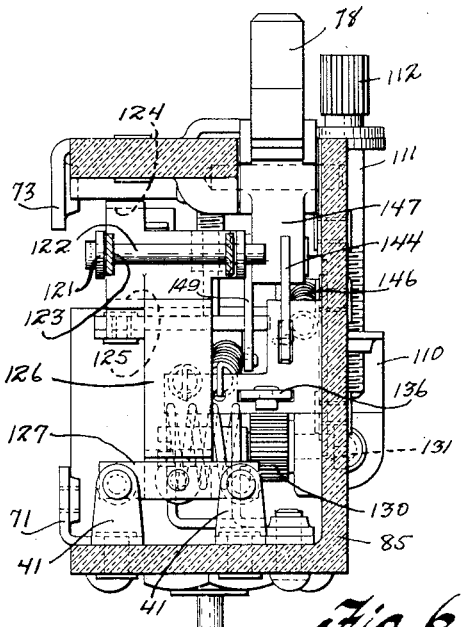
Fig. 6 is a sectional view along the line 6—6 of Fig. 1.
Figure 7:
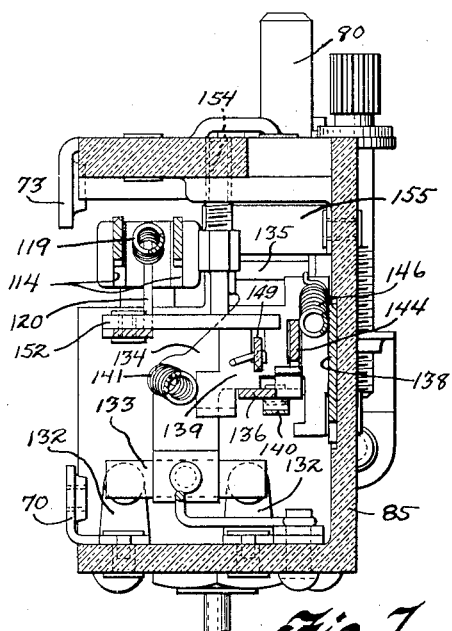
Fig. 7 is a sectional view along the line 7—7 of Fig. 1.

In order to reset the overload means there is provided a reversed L-shaped lever 149 which is pinned to the lower projection 147 of the finger manipulator 78. This lever 149 is yieldingly urged in a counterclockwise direction about the pin connection by a light tension spring 150. The free end of this lever is provided with a nose which engages a lip or tongue 151 which is struck out from the overload contact lever 134. When the finger manipulator 78 is moved to the right, as viewed in Figs. 1, 2, 4, and 5, the nose of the lever 149 engages the inclined surface of the tongue 151 which forces its free end upwardly into engagement with the laterally extending insulating member 152 which extends from a portion of the main contact lever 121. This engagement moves the main switch contact bar 127 to open circuit position during the time at which resetting operation takes place. In addition to engaging the insulating member 152, the link 149 also moves the overload contact lever 134 to its vertical position as viewed in Figs. 1 and 2. This permits the tongue 142 of the slide bar 136 to again engage its shoulder upon the overload contact lever 134 if it has been in the position shown in Fig. 5. If the overload mechanism has been in the position shown in Fig. 4, which it assumes when tripped by an overload current, the overload contact lever 134 will engage the turned-up lip 153 at the adjacent end of the bar 136 and pull the bar to the left as viewed in Fig. 4 so as to permit the leaf spring 140 to again engage the ratchet wheel 130 as shown in Fig. 2. By moving the main switch contact bar 127 to open position during the resetting operation, forcible operation of the refrigerating apparatus under overload conditions by holding the finger manipulator in resetting position at this time is prevented.

The bottom of the lever or link 149 is provided with a locking shoulder 175 which is adapted to engage the arm 139 of the bracket 138 upon which the link 149 normally rests by gravity in order to prevent anyone from opening the main switch contacts 41 and 127 by moving the finger manipulator to resetting position. In the normal resetting operation, this shoulder 175 is not engaged because the free end of the lever or link 149 is raised by the camming surface of the tongue 151, thus causing the shoulder 175 to clear the bottom portion of the slot in the arm 139 of the bracket 138 through which extends the link 149. After the resetting operation is completed, the free end of the link 149 is out of contact with the camming surface 151 and rests by gravity upon the bottom of the slot in the arm 139. Thus, after resetting, any movement of the link 149 toward the camming surface 151 will be stopped by the engagement of the shoulder 175 with the portion of the arm 139 below the slot. By preventing the contact of the end of the link 149 with the camming surface 151 at this time the opening of the main contacts which is dependent upon the coaction of the end of the link 149 with the camming surface 151 is thus prevented after the resetting of the overload device.

The differential between opening and closing of the main switch contacts is adjusted by the screw 154 which extends from the front wall of the box 85 and is adapted at its lower end to engage the insulating member 152 which extends from a portion of the main contact lever 121 to limit the opening movement of this main contact lever. A light leaf spring 155 engages the flats on the hexagonal portion of the differential screw 154 in order to prevent unintended movement thereof. By so doing, the closing pressure and temperature of the main switch contacts is varied independently of the temperature regulating or range adjusting means.

In order to provide means for defrosting the refrigerator, the defrosting finger manipulator 80 is pivoted to an ear 160 formed at one end of the bracket 98. Extending from one side of this finger manipulator 80 is a threaded pin 161 which moves bodily with the finger manipulator 80. The threaded pin 161 is surrounded by a compression type coil spring 162 which is held between a splined adjusting nut 163 threaded upon the pin 161 and spring follower 164 which is slidably mounted upon the free unthreaded end portion of the pin 161 and which presses against knife edges formed upon the free end portion of a toggle link 165 pivoted by means of a pin 166 to a toggle supporting bracket 167 riveted to a portion of the bracket 98. This toggle link has bent portions which receive a roller 168 which is pinned to this toggle link 165. This roller is adapted to bear upon a projecting portion 169 of the bellows follower 103 when the finger manipulator 80 is moved to defrosting position. When the finger manipulator 80 is moved to defrosting position, this compression toggle link mechanism exerts an additional resilient pressure upon the bellows follower 103 which opposes the expansion of the bellows 90 and which thereby requires an additional or higher pressure within the bellows and the thermostat bulb 38 and, consequently, a higher temperature of the thermostat bulb 38 and the evaporator 35 before the main switch contacts will be moved to closed circuit position to enable the refrigerating apparatus to resume operation. When this required high pressure and temperature is reached the upward movement of the bellows follower 103 will also move the roller 168 and the toggle link 165 upwardly across the dead center position so that it returns to its upper inactive position in which the roller 168 is out of the path of the normal movement of the bellows follower 103 and rests against a portion of the bracket 98. In this way, this snap acting defrosting mechanism is returned automatically to inactive or ineffective position upon completion of a defrosting cycle. If it is desired to discontinue a defrosting cycle at any time during the cycle, the finger manipulator 80 can be moved to ineffective position merely by moving the finger manipulator to the left as viewed in Figs. 1, 2, and 3.

In Figs. 12 to 22, a modification of my invention is shown.

Figure 12:
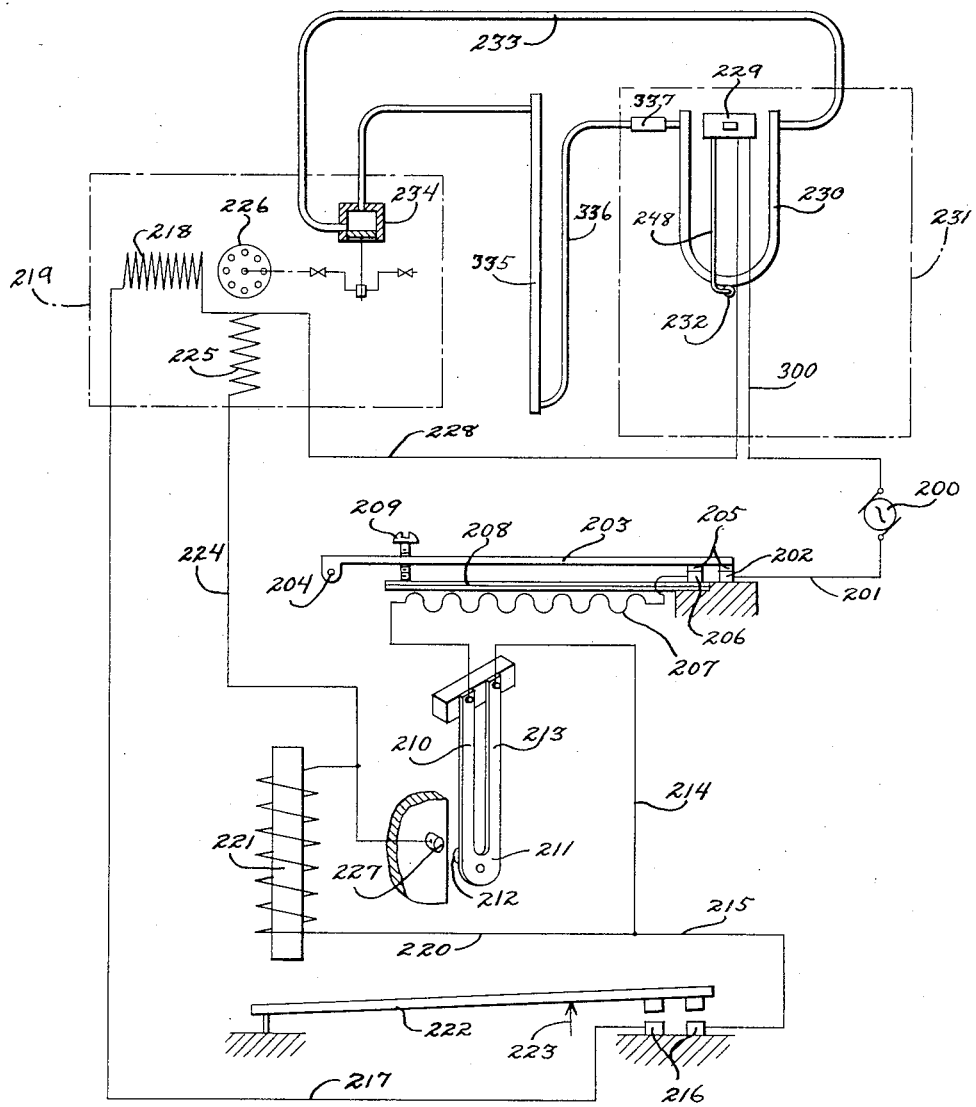
Fig. 12 is a diagrammatic view of a refrigerating system illustrating a modification of my invention.
Figure 13:
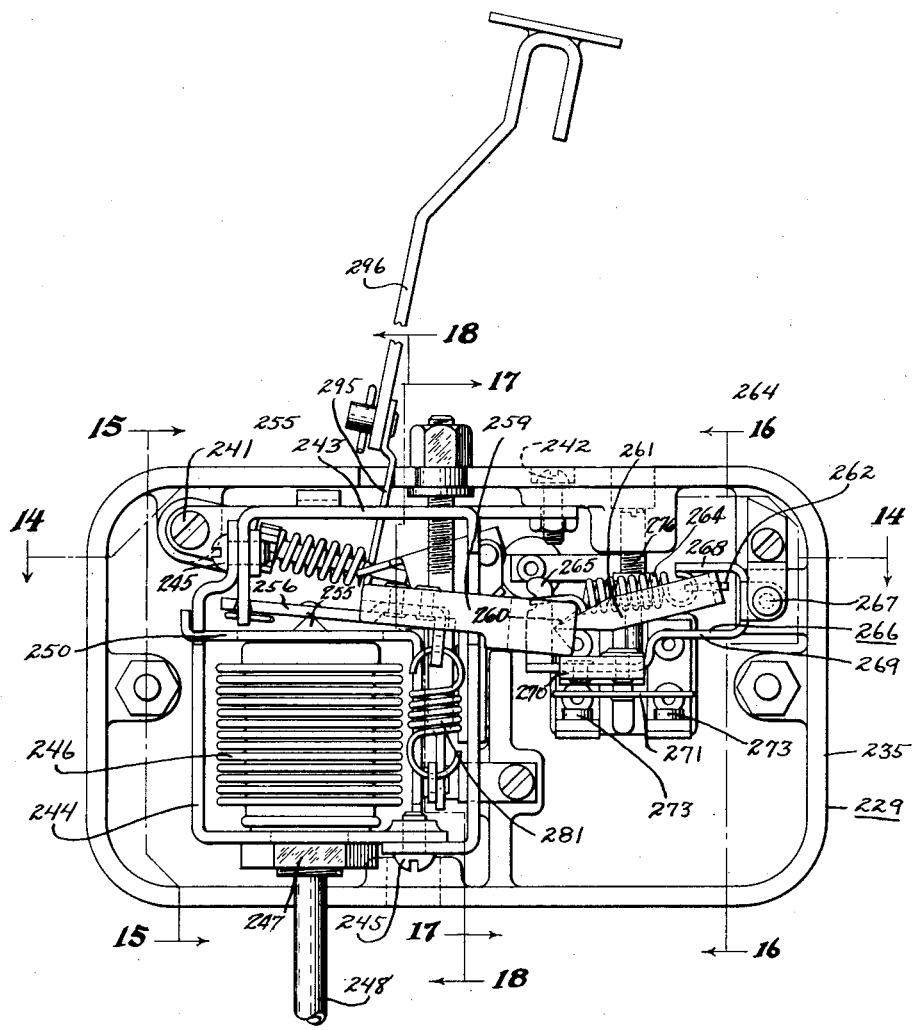
Fig. 13 is a top view with the cover removed of the refrigerator switch shown in Fig. 12.
Figure 17:
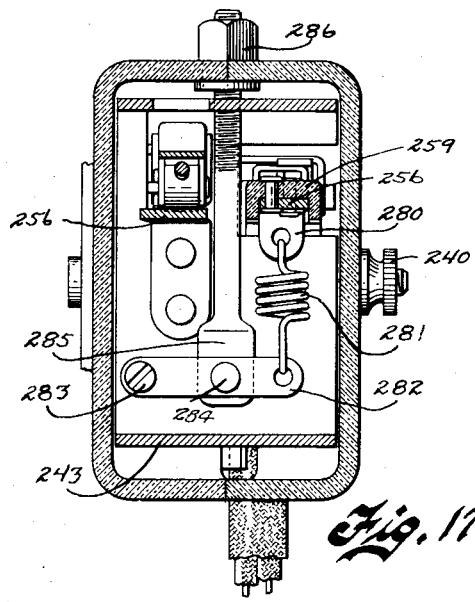
Fig. 17 is a sectional view along the line 17—17 of Fig. 13.
Figure 18:
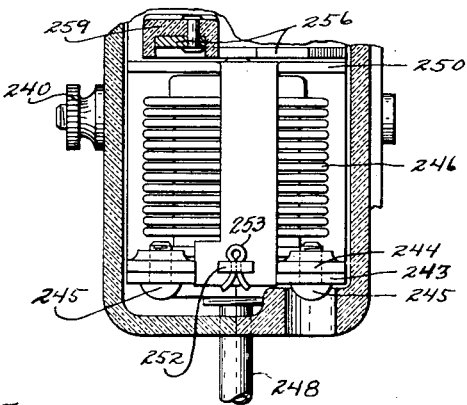
Fig. 18 is a sectional view along the line 18—18 of Fig. 13.
Figure 20:
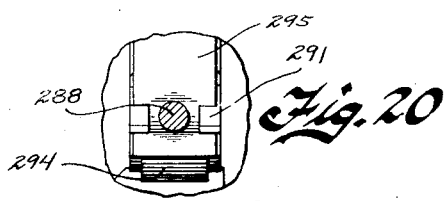
Fig. 20 is a sectional view along the line 20—20 of Fig. 19.

Referring now more particularly to Fig. 12, there is disclosed diagrammatically a source of supply 200, such as a generator or a supply line having an electrical conductor 201 connected to a contact 202 which cooperates with a lever 203 pivoted at 204 which is provided with a pair of contacts 205 which cooperate with the contact 202 and a second contact 206. Connected to the contact 206 is a heater wire 207 which is adapted to heat a bimetal strip 208 when an overload current passes through the heater wire 207 to cause the free end of the bimetal strip 208 to move the set screw 209 upwardly and with it the lever 203 in order to open the circuit between the contacts 202 and 206.

This overload mechanism is connected to a leg 210 of the U-shaped bimetal member 211 having a contact 212 riveted thereto at its closed lower end. The other leg 213 is connected to an electrical conductor 214 which is connected by another conductor 215 to a set of contacts 216. From the contacts 216, an electrical conductor 217 extends to a starting winding 218 located within a sealed unit 219. From the electrical conductor 214 extends an electrical conductor 220 which connects to an electromagnet 221 which operates upon an armature arm 222, which when attracted is adapted to pivot about the pivot point 223 to close the circuit to the contacts 216. The electromagnet 221 is also connected to an electrical conductor 224, one end of which leads to the running winding 225 located within the sealed unit 219 and forming a part of an electric motor 226.

The electrical conductor 224 is also connected to a stationary contact 227 which cooperates with the movable contact 212 fixed to the U-shaped bimetal member 211. The other ends of the running winding 225 and the starting winding 218 are connected by an electrical conductor 228 to a control switch 229 located within a cooling unit or evaporating means 230 within the food compartment 231 of a refrigerator. This control switch 229 is operated by a thermostatic bulb 232 located in contact with the bottom of the evaporating means 230.

The cooling unit 230 absorbs heat from the food compartment 231 and vaporizes the refrigerant which is withdrawn from the cooling unit through a suction line 233 by a compressor 234 located within the sealed unit 219 and directly connected to the electric motor 226. The compressor 234 compresses the refrigerant and forwards the compressed refrigerant to a condenser 235 where the compressed refrigerant is liquefied and forwarded through a supply conduit 336 under the control of a suitable restrictor 337 to the cooling unit 230.

When refrigeration is required, the thermostatic bulb 232 becomes sufficiently warm to cause the control switch 229 to close, thus closing the electric circuit and permitting a heavy surge current to flow from the source of supply 200 through the electrical conductor 201 and from the contact 202 through the contacts 205, and the lever 204 to the contact 206, through the heater 207, and the U-shaped bimetal member 211 and through the electrical conductor 214 and the conductor 220 through the electromagnet 221 and the electrical conductor 224 as well as through the running winding 225, the electrical conductor 228, the control switch 229, to the source of supply. This surge current is insufficient to cause the overload to heater 207 to open the contacts 202 and 206 but is sufficient to cause the electromagnet 221 to attract the armature 222 to close the circuit to the contacts 216 in order to permit electric energy to flow through the electrical conductor 215, contacts 216, and the conductor 217 to the starting winding 218. By permitting the flow of electric energy through starting winding and running winding, the electric motor 226 will be started.

This abnormal surge current causes heating within the U-shaped bimetal strip 211 which after sufficient heating moves to close the contacts 212 and 227. This provides a shunt around the electromagnet 221 and weakens the attraction between the electromagnet and its armature 222, thus permitting the armature 222 to drop and to open the starting winding circuit at the contacts 216 thereby connecting the off supply of electric energy to the starting winding 218. The heating action of the electric current through the leg 210 of the U-shaped bimetal member 211 is insufficient to maintain the contacts 212 and 227 in closed position and these contacts open, thus causing the current to the running winding to flow through the leg 213 to conductor 214 and the conductor 220 through the electric magnet 221 to the starting winding 225. However, the amount of current passing through the electromagnet 221 and the running winding 225 is insufficient to cause attraction of the armature 222. The circuit thus operates under this condition until the thermostat 232 becomes sufficiently cold to cause the control switch to be opened to open the electric circuit. This permits the U-shaped bimetal member 211 to cool and to again assume starting position. Instead of being connected in the circuit as shown in Fig. 12, the entire overload means may be placed in series with the electric conductor 224 and the running winding 225 where the overload means may be made more sensitive to overloads during the running period of the driving motor and not be subject to starting winding currents. In this way more sensitive overload protection may be provided.

Referring now more particularly to Figs. 13 to 22 inclusive, there is shown a more complete embodiment of the control switch 229. The control switch 229 is provided with a lower housing 235 and an upper housing or cover 236, each of which is made of a suitable structural insulating material, such as hard rubber. The housing is supported upon a cross strip 237 extending from one side to the other of the cooling unit 230. A screw 238 fastens the housing to this cross strip 237 by means of a nut 239 which fastens the lower housing to the cross strip and an upper knurled nut 240 which fastens the upper housing 236 to the lower housing 235 and the cross strip 237.

Fastened to the lower housing 235 by screws 241 and 242 is a bracket 243 which is connected to an L-shaped bellows support member 244 by the screws 245. A metal bellows 246 is fastened to this bellows support member by a nut 247 and is connected to the thermostat bulb 232 by a tube 248. The bellows 246 is protected from excessive expansion by an inverted L-shaped flat metal stop member 250 which is provided with prongs 251 at one end which engage slots in the L-shaped bellows supporting member 244, while the other end is provided with an aperture or slot which receives a tongue 252 provided with a cotter pin 253 for fastening the bellows stop to the bellows supporting member 244.

The metal bellows 246 is provided at its upper end with a conical projection 255 which engages a recess in a bellows follower 256 which is provided with an aperture which receives a tongue 257 provided with a cotter pin 258 for pivotally fastening the bellows follower to the projection of the bracket 243. Upon the freely movable end of the bellows follower 256 is an insulating arm or extension 259 which is provided with a pair of V-shaped notches 260 which receive a pair of knife edges formed upon the end of the leg of the U-shaped secondary lever 261 which forms a part of a double toggle snap acting mechanism. This secondary lever is provided with a T-shaped pin 262 which extends through an aperture in the closed end of the secondary lever and is provided with an eyelet 263 to which is connected a tension-like toggle spring 264 having its other end connected to a projection 265 which extends up between the parts of the insulating arm 259. The projection 265 is struck up from a contact lever 266 which is pivoted at 267 to the lower housing 235. This contact lever is provided with stop portions 268 and 269 as well as an extension 270 which is pivotally connected to contact bar 271 which when in closed position serves to bridge a set of contacts 273 which are fastened to the lower housing 235.

The contact lever 266 is also provided with a second extension 275 formed of an insulating material which is adapted to contact with a differential adjusting screw 276 which is provided with a hexagonal portion 277 cooperating with a light leaf spring 278 for preventing evaporation from altering the differential adjustment and causing the differential screw 276 to be turned thereby. This differential screw 276 limits the opening movement of the contact lever 266 and thereby varies the differential between the opening and closing of the switch contacts.

A range adjustment is also provided. The bellows follower 256 is provided with an ear 280 to which is connected a tension spring 281 having its lower end connected to a lever 282 which is pivoted at its opposite end by a screw 283 to the bracket 243. At an intermediate point the lever 282 is provided with a pin 284 which connects the lever to an adjusting screw 285 provided with a flange nut 286 at its upper end which may be employed to raise or lower the lever 282 in order to vary the tension upon the spring 281 in order to control and regulate the expansion of the metal bellows 246.

Figure 19:
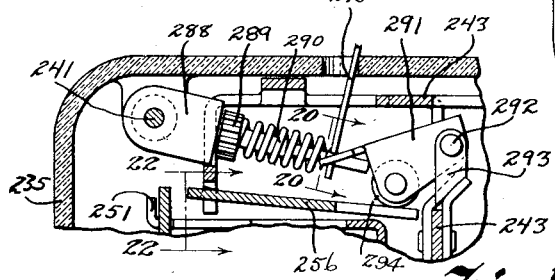
Fig. 19 is a sectional view along the line 19—19 of Fig. 14.
Figure 21:
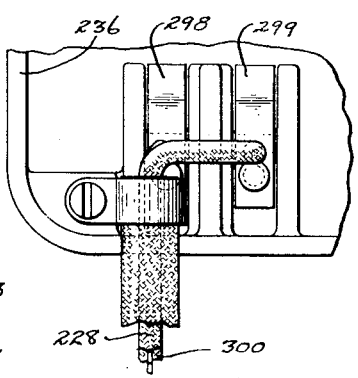
Fig. 21 is a view showing a fragment of the terminal connections in the top cover.
Figure 22:
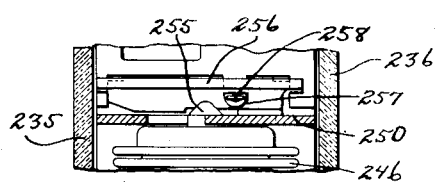
Fig. 22 is a sectional view along the line 22—22 of Fig. 19.

The switch is also provided with a defrosting mechanism which is pivoted upon the screw 241. This defrosting mechanism comprises a member 288 pivoted upon the screw 241 and having a threaded extending portion provided with an adjusting nut 289 which bears against one end of a compressing toggle spring 290 which surrounds the threaded extending portion. The other end of the toggle compression spring 290 cooperates with the toggle link 291 which is pivoted by a pin 292 to a bracket 293 which is riveted to the bracket 243. This toggle link 291 is provided with a roller 294 which is adapted to bear upon the bellows follower 256 when in its effective or actuating position as shown in Fig. 19. This snap acting mechanism through the roller 294 interposes an additional resistance to the expansion of the metal bellows 246 and requires a sufficiently high temperature, such as 40° F. to permit defrosting of the evaporator before sufficient pressure will be produced in the bellows 246 to overcome this additional resistance and move the contact bar 271 to closed circuit position. In so doing, the bellows follower moves upwardly thereby moving the roller 294 and the snap acting mechanism upwardly to inactive position wherein the roller remains out of the path of movement of the bellows follower 256. The upward movement of the toggle link is stopped by the bracket 208.

The snap acting defrosting mechanism is therefore automatically turned off when the proper temperature is reached. However, manual means in the form of a link 295 is connected to the extension of the member 280 and the toggle link 201 at the end of the compression spring 290 in order to initiate a defrosting cycle. This link 295 is provided with an extension 296 which extends to the front of the cooling unit. In order to initiate a defrosting cycle this extension 296 is pushed rearwardly, thus moving the defrosting mechanism into its position with the roller 294 bearing upon the bellows follower 256. If at any time before completion of the defrosting cycle it is desired to resume normal operation immediately, the extension 296 may be pulled out to remove the roller 294 from the path of the bellows follower 256 and to move the defrosting mechanism to retracted position in order to permit the refrigerating system to resume normal operation immediately.

The top cover 236 is provided with terminals 298 and 299 to which are connected the electrical conductor 228 and the electrical conductor 300 which lead respectively to the electric motor and the source of supply. These terminals 298 and 299 are provided with spring portions which are adapted to engage extensions 301 extending from the switch contacts 273. In this way a convenient connection is provided.

While the form of embodiment of the invention as herein disclosed, constitutes a preferred form, it is to be understood that other forms might be adopted, all coming within the scope of the claims which follow.

What is claimed is as follows:

1. A switch including means responsive to a predetermined flow of electric energy through an electric circuit for opening the electric circuit, resetting means for said first mentioned means for moving the first mentioned means to closed circuit position from open position, and locking means ineffective during the moving of the resetting means from open position to closed position for preventing the movement of the resetting means to closed position after the resetting means has been reset.

2. A switch including means responsive to a predetermined flow of electric energy through an electric circuit for opening the electric circuit, resetting means for said first mentioned means for moving the first mentioned means to closed circuit position from open position, means for opening the electric circuit during the resetting operation, and locking means ineffective during the moving of the resetting means from open position to closed position for preventing the movement of the resetting means to closed position after being reset in order to prevent the opening of the electric circuit.

3. A switch including a plurality of sets of switch contacts arranged in series relation, means for opening and closing a first set of switch contacts, overload means responsive to overload conditions for opening a second set of contacts, said overload means having resetting means for closing the second set of contacts, said resetting means being provided with means for holding open the first set of contacts during the resetting of the second set of contacts, said overload means being constructed to prevent the opening of the first set of contacts by the resetting means while the second set of contacts are in reset position.

4. A switch including means responsive to a predetermined flow of electric energy through an electric circuit for opening the electric circuit, resetting means for said first mentioned means for moving the first mentioned means to closed circuit position from open position, said resetting means having protecting means for opening the electric circuit during the resetting of said first mentioned means, said resetting means being constructed to prevent the actuation of the protecting means when the first mentioned means is in reset position.

GEORGE C. PEARCE.